United States Patent [19]

Malicki

[11] Patent Number: 4,823,606

[45] Date of Patent: Apr. 25, 1989

[54] DIAPHRAGM TRANSDUCER FOR SENSING LOADING

[75] Inventor: Raymond W. Malicki, Dearborn Heights, Mich.

[73] Assignee: Carron & Company, Inkster, Mich.

[21] Appl. No.: 210,723

[22] Filed: Jun. 23, 1988

[51] Int. Cl.$^4$ .............................................. F16B 31/02
[52] U.S. Cl. ................................... 73/761; 73/862.65
[58] Field of Search ................... 73/761, 862.65, 784, 73/763, 768, 862.66, 862.67; 338/2, 5

[56] References Cited

U.S. PATENT DOCUMENTS

| | | | |
|---|---|---|---|
| 2,848,892 | 8/1958 | Hoffman .............................. | 338/5 X |
| 2,925,576 | 2/1960 | Wakeland et al. ................ | 73/761 X |
| 3,161,844 | 12/1964 | Kabell ................................... | 338/2 |
| 3,493,912 | 2/1970 | Tull et al. ............................. | 338/2 |
| 4,267,725 | 5/1981 | Roth et al. .......................... | 338/5 X |
| 4,429,579 | 2/1984 | Wilhelm ....................... | 73/862.65 X |
| 4,553,124 | 11/1985 | Malicki ................................ | 338/5 |
| 4,630,490 | 12/1986 | Malicki ........................... | 73/862.65 |

Primary Examiner—Jerry W. Myracle
Attorney, Agent, or Firm—Brooks & Kushman

[57] ABSTRACT

A diaphragm transducer (10) for sensing loading includes a bolt (12) having a bolt hole (26) whose head portion (28) receives the diaphragm (34) of a transducer member (32) which also includes a stem (36) received within a shank portion (30) of the bolt hole. Both the diaphragm (34) and the stem (36) are fixed so as to sense loading by one or more strain gauges on the diaphragm. The transducer member (32) preferably has a unitary construction with the diaphragm (34) and stem (36) integral with each other. A bolt seat (40) and a retainer (42) preferably cooperate to clamp a rim (50) of the diaphragm periphery, while threads (58) on a distal end (38) of the stem (36) are received by threads (62) of the bolt hole shank portion (30) to secure the stem.

12 Claims, 3 Drawing Sheets

4,823,606

DIAPHRAGM TRANSDUCER FOR SENSING LOADING

TECHNICAL FIELD

This invention relates to a diaphragm transducer for sensing loading by strain gauge measurement.

BACKGROUND ART

U.S. Pat. Nos. 4,553,124 Malicki and 4,630,490 Malicki disclose strain gauge transducer assemblies for sensing loading such as of a bolt used to fasten two or more members to each other. The strain gauge transducer assembly disclosed by the No. 4,553,124 Malicki patent includes a counterbored bolt that receives a strain gauge transducer having a web portion that is operable to sense tensioning of the bolt shank. The strain gauge transducer assembly of the No. 4,630,490 Malicki patent discloses a strain gauge transducer assembly including a sensing member such as a bolt that receives a strain gauge transducer having a four-sided intermediate portion on which the strain gauges are mounted so as to sense compression applied to the bolt shank. Each of these strain gauge transducer assemblies functions effectively to individually sense either tension or compression loading but is not capable of sensing both types of loading. Also, the construction of each strain gauge requires that the associated bolt be of at least a predetermined size so as to be capable of receiving the web or four-sided intermediate portion on which the strain gauges are mounted. This size limitation makes it difficult to sense loading of smaller bolts such as self-tapping metal screws for which it would be nevertheless desirable to be capable of sensing loading.

Diaphragm type transducers have primarily been used in industry to measure fluid pressure. See, for example, U.S. Pat. Nos. 2,848,892 Hoffman; 3,161,844 Kabell; 3,493,912 Tull et al. 4,267,725 Roth et al.

DISCLOSURE OF INVENTION

One object of the present invention is to provide an improved transducer capable of sensing loading in relatively small bolts such as, for example, self tapping metal screws.

Another object of the present invention is to provide an improved transducer that is capable of sensing both tension and compression loading of an associated bolt.

In carrying out the above and other objects of the invention, a diaphragm transducer for sensing loading in accordance with the present invention includes a bolt having a head and a shank extending from the head. This bolt defines a transducer hole having a head portion located within the bolt head and a shank portion located within the bolt shank with the head portion of the bolt hole being larger than its shank portion. A transducer member of the diaphragm transducer is received within the bolt hole and includes a diaphragm fixedly mounted within the head portion of the bolt hole. This transducer member also includes a stem that extends from the diaphragm into the shank portion of the bolt hole and has a distal end fixedly secured to the bolt. At least one strain gauge on the diaphragm senses deflection thereof as the bolt is loaded in order to permit measurement of this loading.

This construction of the diaphragm transducer, with the strain gauge diaphragm of the transducer member in the larger head of the bolt and with the smaller stem of the transducer member in the smaller shank of the bolt, permits load sensing of smaller bolts than has previously been possible as well as permitting sensing of both tension and compression loading of the bolt.

In the preferred construction of the diaphragm transducer, the diaphragm and the stem of the transducer member are integral with each other. This integral construction of the transducer member diaphragm and stem is preferably provided by machining of a single piece of metal of the same type as the bolt so as to have the same coefficient of thermal expansion such that heating and cooling does not produce diaphragm deflection. For example, if the bolt is steel, which is usually the case, the transducer member will be machined from steel with the integral construction. Likewise, if the bolt is aluminum, the transducer member will likewise be machined from aluminum so as to have the same rate of thermal expansion as the bolt.

In the preferred construction of the diaphragm transducer, the bolt includes a seat within the head portion of the bolt hole and also includes a retainer that clamps the diaphragm against the bolt seat. The periphery of the diaphragm preferably includes a rim that is clamped between the bolt seat and the retainer so as to restrain the periphery of the diaphragm in a manner that facilitates the reading of the diaphragm deflection. The retainer of the diaphragm transducer preferably comprises a locking ring having a press fit into the bolt head within the head portion of the bolt hole to cooperate with the bolt seat in clamping the diaphragm ring. A suitable adhesive may also be utilized to cooperate with the press fit in securing the locking ring to the bolt head within the head portion of the bolt hole.

The preferred construction of the diaphragm transducer has the distal end of the stem of the transducer member provided with threads and also has the shank portion of the bolt hole provided with threads that receive the stem threads to secure the stem. The rim of the diaphragm includes formations for torquing the stem threads into the hole threads in order to provide the stem securement to the bolt. A plurality of the strain gauges are preferably mounted on the diaphragm inside the rim and are connected within a Wheatstone bridge to measure the extend of the diaphragm deflection which is representative of the bolt loading.

In the preferred construction of the diaphragm transducer, the diaphragm has a round shape with a diameter D and a thickness T, and the stem has an effective length L. These dimensions D, T, and L are selected to provide a maximum diaphragm deflection of about $\frac{1}{3}$ T when the bolt is loaded to its proof load.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
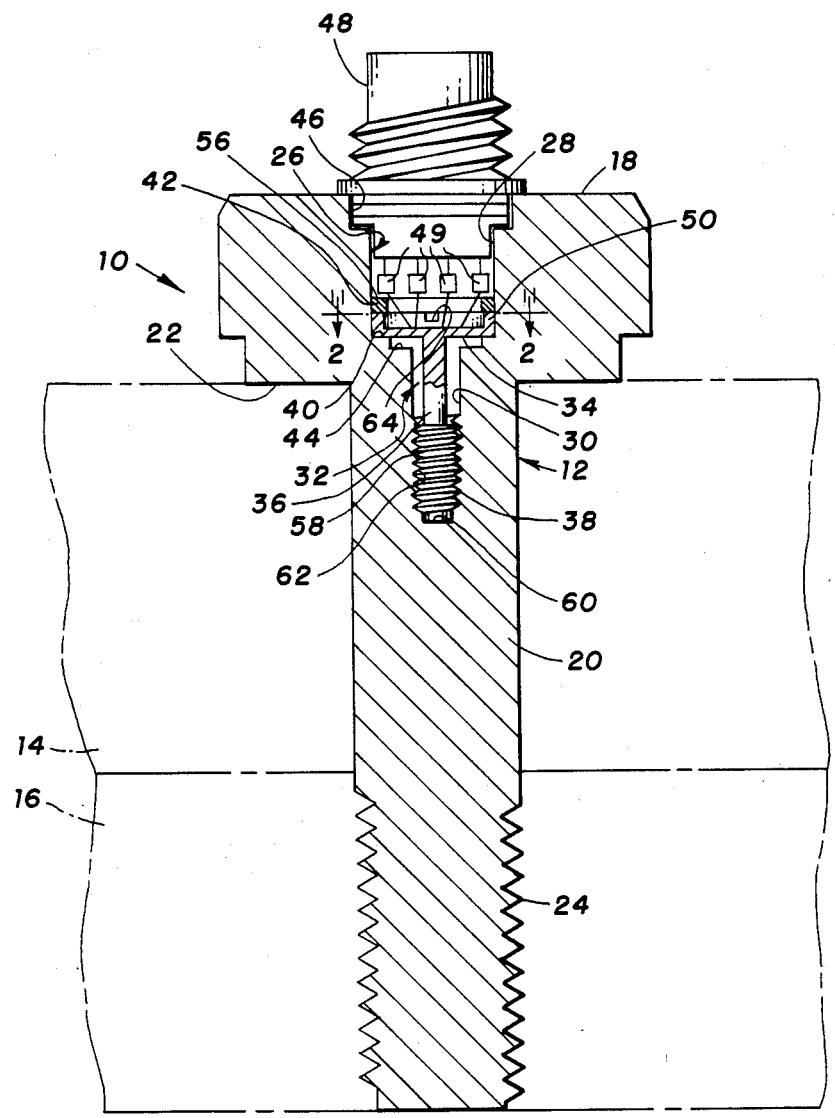
FIG. 1 is a sectional view taken through a bolt type diaphragm transducer constructed in accordance with the present invention.

With reference to FIG. 1 of the drawings, a diaphragm transducer for sensing loading in accordance with the present invention is indicated generally by 10 and includes a bolt 12 illustrated as connecting two members 14 and 16 with the loading of this connection being sensed by the transducer as is hereinafter more fully described. Bolt 12 has a head 18 and a shank 20 that extends from the head with a smaller size in accordance with the conventional construction of bolts. The bolt head 18 has a seat surface 22 that engages the one member 14 and the shank 20 has a threaded end 24 that is threaded into a threaded hole in the other member 16 in order to secure the connection between the members. A transducer hole 26 formed in the bolt 12 has a head portion 28 located within the bolt head 18 and a shank portion 30 located within the bolt shank 20. The head portion 28 of bolt hole 26 is larger than its shank portion 30, which may be provided by any type of drilling or other machining operation performed on a conventional bolt.

Transducer 10 shown in FIG. 1 also includes a transducer member 32 received within the bolt hole 26 and having a diaphragm 34 fixedly mounted within the head portion 28 of the bolt hole as is hereinafter more fully described. The transducer member 32 also includes a stem 36 that extends from the diaphragm 34 into the shank portion 30 of the bolt hole 26 and has a distal end 38 fixedly secured to the bolt. As is hereinafter more fully described, at least one strain gauge on the diaphragm 34 senses deflection thereof as the bolt is loaded so as to thereby measure the loading of the bolt.

The construction of the transducer 10 illustrated in FIG. 1 can be utilized to sense loading of smaller bolts than heretofore possible due to the manner in which the larger diaphragm 34 is located within the bolt head 18 and the smaller stem 36 is located within the smaller shank 20. Also, both tension and compression of the bolt 12 can be sensed due to the construction of the transducer 10 which restrains both the diaphragm 34 and the distal end 38 of the stem 36.

In the preferred construction, the diaphragm transducer 10 has the diaphragm 34 and the stem 36 of the transducer member 32 integral with each other. This integral construction of the transducer member 32 is preferably provided by a machining operation from a single piece of metal which is of the same composition as the bolt 12 with which the transducer member 32 is utilized so as to have the same rate of thermal expansion such that no deflection of the diaphragm takes place along the axial direction of the bolt as the temperature changes. Thus, if the bolt 12 is made of steel, the transducer member 32 will also be machined from steel with its integral construction; it should be noted that steel alloys have generally the same rate of thermal expansion such that it is not necessary to manufacture the transducer member 32 from different types of steel when different compositions of steel bolts are utilized. Furthermore, if the bolt 12 is made from aluminum or another metal, the transducer member 32 is likewise machined from aluminum or the other metal in order to have the same composition and thus the same rate of thermal expansion.

As shown in FIG. 1, the bolt 12 is provided with a seat 40 located within the head portion 28 of the bolt hole 26 in a concentric relationship with the central axis of the bolt. A retainer 42 of the transducer clamps the diaphragm 34 against the bolt seat 40 to provide its fixed relationship within the head portion 28 of the bolt hole 26. Just below the annular bolt seat 40 against which the diaphragm 34 is clamped by the retainer 42, the bolt hole 26 includes an undercut 44 of an annular shape that surrounds the stem 36 of the transducer member so as to provide space to permit the diaphragm to flex without being inhibited by the bolt during such flexing. Above the retainer 42, the head portion 28 of bolt hole 26 includes an annular counterbore 46 that receives a connector 48 which has diaphragm strain gauge connections 49 for connecting the strain gauges used in the load sensing as is hereinafter more fully described.

Figure 2:
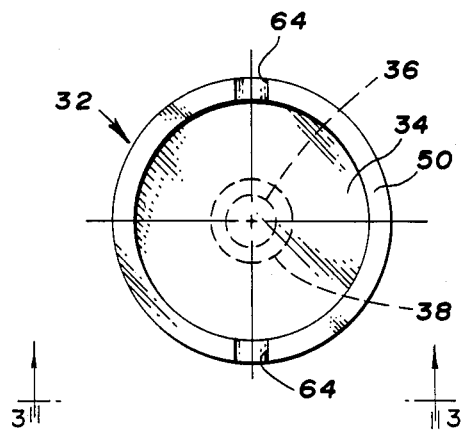
FIG. 2 is a top end view taken along line 2—2 of FIG. 1 to illustrate a transducer member of the diaphragm transducer.
Figure 3:
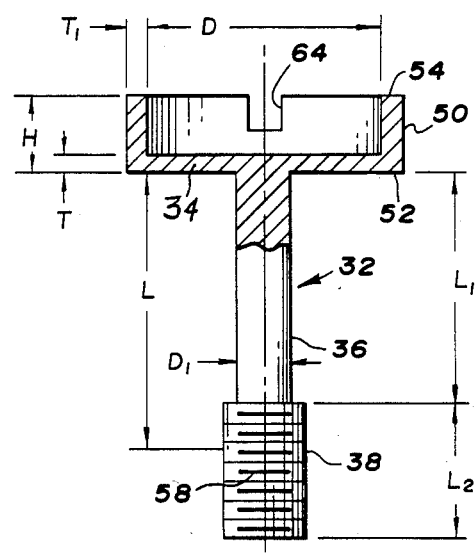
FIG. 3 is a side view of the transducer member taken along the direction of line 3—3 in FIG. 2.

As illustrated best in FIGS. 2 and 3, the diaphragm 34 has a periphery including a rim 50 that extends axially with respect to the axis of the stem 36 of transducer member 32 and preferably has an annular shape whose lower surface 52 (FIG. 3) seats against the bolt seat 40 shown in FIG. 1 and whose upper surface 54 (FIG. 3) is engaged by the retainer 42 shown in FIG. 1. This retainer 42 is preferably a locking ring having a press fit into the head portion 28 of bolt hole 26 to cooperate with the bolt seat 40 in clamping the diaphragm rim 50. Such clamping of the diaphragm rim 50 causes the diaphragm 34 to flex with an S-shaped curvature in a radial direction between the rim 50 and the center of the diaphragm 34 in a manner that facilitates the strain gauge reading of the diaphragm deflection upon bolt loading. A suitable adhesive 56 is also preferably utilized to cooperate with the press fit in securing the locking ring retainer 42 to the bolt head 18 within the head portion 28 of the bolt hole 26.

As shown in both FIGS. 1 and 3, the distal end 38 of the stem 36 of transducer member 32 includes threads 58 and, as shown in FIG. 1, the shank portion 30 of the bolt hole 26 includes an end 60 having threads 62 that receive the stem threads 58 in order to secure the stem 36 with respect to the bolt. It should also be noted that the diaphragm rim 50 includes formations 64 for torquing the stem threads 58 into the bolt hole threads 62 shown in FIG. 1 to secure the stem end 38 and also seat the lower surface of the diaphragm rim 50 against the bolt seat 40. These rim formations 64 are preferably located at diametrically opposite locations as shown in FIG. 2 so as to permit the use of a screwdriver to provide the torquing that provides the threaded assembly of the transducer member 32 to the bolt.

As illustrated best in FIG. 3, the transducer member 32 has a diaphragm diameter D, a diaphragm thickness T, and an effective stem length L that deflects upon loading. This effective stem length L includes the entire length L1 of the stem 36 between the diaphragm 34 and its threaded distal end 38 and a portion of the length L2 of the threaded distal end 38 of the stem. More specifically, the effective length L includes approximately 30% of the length L2 when the latter dimension is about twice the diameter of the threaded end 38. When the length L2 is less than twice the diameter of the threaded end 38, the effective length will be slightly greater than 30% of its length. When the length L2 is greater than twice the diameter of the threaded end 38, the portion of the length L2 that is added to the stem length L1 to provide the effective length L is no greater than the 30% added when the length L2 is twice the diameter of the threaded end. The dimensions D, T, and L are selected to provide a maximum diaphragm deflection of about $\frac{1}{3}$ T when the bolt 12 is loaded to its proof load which is the maximum tension load the bolt can withstand without incurring a permanent deformation.

One preferred embodiment of the transducer 10 which has been found to function satisfactorily has a diaphragm diameter D of 0.2 inches, a diaphragm thickness T of 0.015 plus or minus 0.001 inches, a stem length L1 of 0.22 inches, a threaded end length L2 of 0.1 inches, and an effective stem length L of about 0.25 inches. The transducer member 32 of this preferred embodiment also has a rim wall thickness T1 of about 0.0225 to 0.0245 inches, a rim wall height H of about 0.07 inches, and a stem diameter D1 of about 0.045 to 0.055 inches as well as having its threaded end 38 provided with a 4–40 thread. Furthermore, the steel from which the transducer member 32 is machined is a 4130 alloy with a hardness of 34 on the Rockwell C scale.

Figure 4:
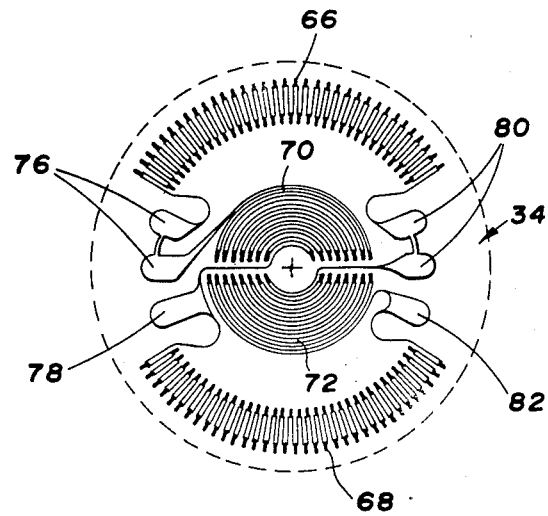
FIG. 4 is a view taken in the same direction as FIG. 2 illustrating the placement of strain gauges mounted on a diaphragm of the transducer member.
Figure 5:
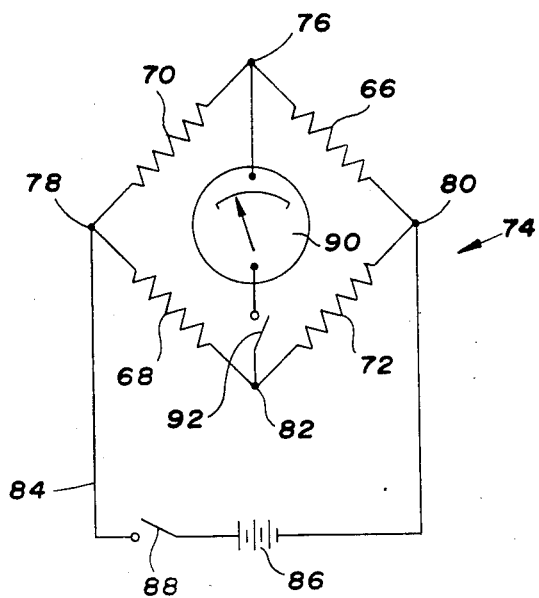
FIG. 5 is a view of a circuit that illustrates the manner in which the strain gauges of the diaphragm transducer are connected to measure loading.

As illustrated in FIG. 4, the diaphragm 34 is provided with four strain gauges 66, 68, 70, and 72. The two strain gauges 66 and 68 measure radial deformation adjacent the periphery of the diaphragm 34 where the radial deformation is the greatest, while the two strain gauges 70 and 72 measure circumferential deformation adjacent the center of the diaphragm where the circumferential deformation is the greatest. As shown in FIG. 5, these strain gauges 66, 68, 60 and 72 are connected in a Wheatstone bridge 74 which has a soldered junction 76 connecting the strain gauges 66 and 70, a soldered junction 78 connecting the strain gauges 68 and 70, a soldered junction 80 connecting the strain gauges 66 and 72, and a soldered junction 82 connecting the strain gauges 68 and 72. Between the junctions 78 and 80, a control circuit 84 includes a source of power 86 and a switch 88 for energizing the Wheatstone bridge 74. Between the junctions 76 and 82, the Wheatstone bridge includes a meter 90 and switch 92 for use in reading the bridge output that reflects the loading of the bolt with compensation for temperature changes and for bending of the bolt shank. The soldered junctions 76, 78, 80, and 82 are connected by the connections 49 shown in FIG. 1 to the connector 48 which facilitates connection to instrumentation for reading the bolt loading.

While the best mode for carrying out the invention has been described in detail, those familiar with the art to which this invention relates will recognize various alternative designs and embodiments for practicing the invention as defined by the following claims.

What is claimed is:

1. A diaphragm transducer for sensing loading comprising: a bolt having a head and a shank extending from the head; said bolt defining a transducer hole having a head portion located within the bolt head and having a shank portion located within the bolt shank; said head portion of the bolt hole being larger than the shank portion thereof; a transducer member received within the bolt hole and including a diaphragm fixedly mounted within the head portion of the bolt hole; said transducer member also including a stem that extends from the diaphragm into the shank portion of the bolt hole and has a distal end fixedly secured to the bolt; and at least one strain gauge on the diaphragm for sensing deflection thereof as the bolt is loaded.

2. A diaphragm transducer as in claim 1 wherein the diaphragm and stem of the transducer member are integral with each other.

3. A diaphragm transducer as in claim 1 further including a seat on the bolt within the head portion of the bolt hole and a retainer that clamps the diaphragm against the bolt seat.

4. A diaphragm transducer as in claim 3 wherein the periphery of the diaphragm includes a rim that is clamped between the bolt seat and the retainer.

5. A diaphragm transducer as in claim 4 wherein the retainer comprises a locking ring having a press fit into the bolt head within the head portion of the bolt hole to cooperate with the bolt seat in clamping the diaphragm rim.

6. A diaphragm transducer as in claim 5 further including adhesive that cooperates with the press fit in securing the locking ring to the bolt head within the head portion of the bolt hole.

7. A diaphragm transducer as in claim 5 wherein the distal end of the stem of the transducer member includes threads, the shank portion of the bolt hole having threads that receive the stem threads, and the rim of the diaphragm including formations for torquing the stem threads into the hole threads.

8. A diaphragm transducer as in claim 1 wherein the distal end of the stem of the transducer member includes threads, and the shank portion of the bolt hole having threads that receive the stem threads.

9. A diaphragm transducer as in claim 8 that includes a plurality of strain gauges on the diaphragm, and a connector that is mounted on the bolt head and has connections to the strain gauges.

10. A diaphragm transducer as in any preceding claim wherein the transducer member has a diaphragm diameter D, a diaphragm thickness T, and an effective stem length L, and said dimensions D, T, and L being selected to provide a maximum diaphragm deflection of about $\frac{1}{3}$ T when the bolt is loaded to its proof load.

11. A diaphragm transducer for sensing loading comprising: a bolt having a head and a shank extending from the head; said bolt defining a transducer hole having a head portion located within the bolt head and having a shank portion located within the bolt shank and having a threaded end; said head portion of the bolt hole having a seat and being larger than the shank portion thereof; an integral transducer member received within the bolt hole and including a diaphragm having a periphery engaged with the seat in the head portion of the bolt hole; said transducer member also including a stem that extends from the diaphragm into the shank portion of the bolt hole and has a distal threaded end received by the threaded end of the shank portion: a retainer that cooperates with the seat in fixedly securing the periphery of the diaphragm within the head portion of the bolt hole; and a plurality of strain gauges on the diaphragm for sensing deflection thereof as the bolt is loaded.

12. A diaphragm transducer for sensing loading comprising: a bolt having a head and a shank extending from the head; said bolt defining a transducer hole having a head portion located within the bolt head and having a shank portion located within the bolt shank and having a threaded end; said head portion of the bolt hole having a seat and being larger than the shank portion thereof; an integral transducer member received within the bolt hole and including a diaphragm received within the head portion of the bolt hole; said diaphragm having a diameter D and a thickness T and including a peripheral rim engaged with the seat in the head portion of the bolt hole; said transducer member also including a stem having a length l extending from the diaphragm into the shank portion of the bolt hole and having a distal threaded end received by the threaded end of the shank portion; a retainer that engages the diaphragm rim to cooperate with the seat in fixedly securing the periphery of the diaphragm within the head portion or the bolt hole; the dimensions D, T, and L being selected to provide a maximum diaphragm deflection of about $\frac{1}{3}$ T when the bolt is loaded to its proof load; and at least one strain gauge on the diaphragm for sensing deflection thereof as the bolt is loaded.

* * * * *

UNITED STATES PATENT AND TRADEMARK OFFICE
CERTIFICATE OF CORRECTION

PATENT NO. : 4,823,606

DATED : April 25, 1989

INVENTOR(S) : Raymond W. Malicki

It is certified that error appears in the above-identified patent and that said Letters Patent is hereby corrected as shown below:

Column 7, line 3, Claim 12, "1" should be --L-- and "lextending" should be --extending--.

Signed and Sealed this

Eighth Day of May, 1990

Attest:

HARRY F. MANBECK, JR.

*Attesting Officer*   *Commissioner of Patents and Trademarks*